United States Patent [19]

Porraz et al.

[11] 4,102,137
[45] Jul. 25, 1978

[54] COATING AND PROTECTIVE DEVICE

[75] Inventors: Mauricio Porraz, Gutenberg 47, Mexico 5, Mexico; Margret Klose, Zollikofen, Switzerland

[73] Assignee: Mauricio Porraz, Mexico City, Mexico

[21] Appl. No.: 747,749

[22] Filed: Dec. 6, 1976

[51] Int. Cl.² .............................................. E02B 3/12
[52] U.S. Cl. .......................................... 61/38; 61/113
[58] Field of Search ....................... 61/37, 38, 113, 35, 61/7

[56] References Cited

U.S. PATENT DOCUMENTS

| | | | |
|---|---|---|---|
| 3,396,542 | 8/1968 | Lamberton | 61/38 |
| 3,425,227 | 2/1969 | Hillen | 61/38 |
| 3,524,320 | 8/1970 | Turzillo | 61/38 |
| 3,561,219 | 2/1971 | Nishizawa et al. | 61/38 |
| 3,670,504 | 6/1972 | Hayes et al. | 61/37 |
| 3,696,623 | 10/1972 | Heine et al. | 61/38 |
| 3,786,640 | 1/1974 | Turzillo | 61/38 |
| 3,793,845 | 2/1974 | Keith | 61/113 |

FOREIGN PATENT DOCUMENTS 1,276,572   6/1972   United Kingdom ..................... 61/37

*Primary Examiner*—Kenneth Downey
*Assistant Examiner*—Alex Grosz
*Attorney, Agent, or Firm*—Jones, Tullar & Cooper

[57] ABSTRACT

A woven coating and protection device which provides for the containment in pockets and for the reinforcement of settable materials such as concrete is disclosed. The coating and protection device may be employed as an erosion control or prevention mat or may alternatively be utilized to provide ballast and protection for underwater pipelines. The device is woven from any desired material with the woven walls of the pockets coming together and being interwoven to form connecting joints between the pockets and further being woven with integral reinforcing guys which strengthen the device and control its shape. The joint areas of material between the pockets may either be permeable or non-permeable as desired to either allow or prevent the flow of water or the growth of vegetation when the device is used in erosion prevention.

7 Claims, 8 Drawing Figures

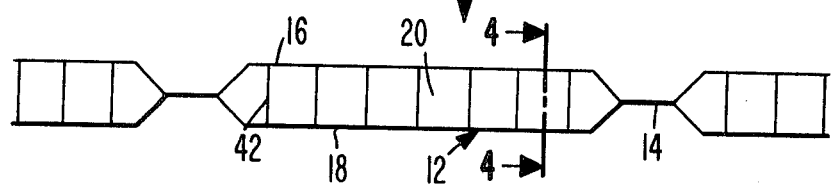
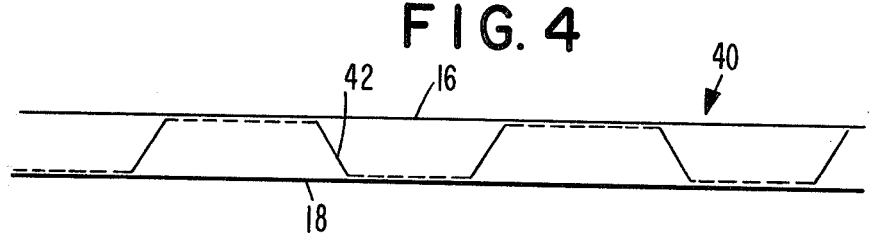
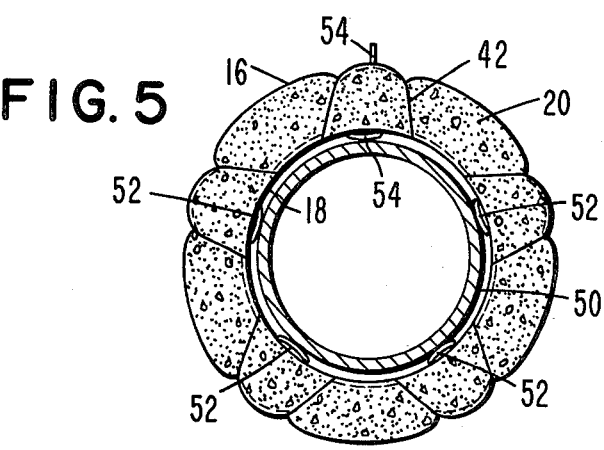
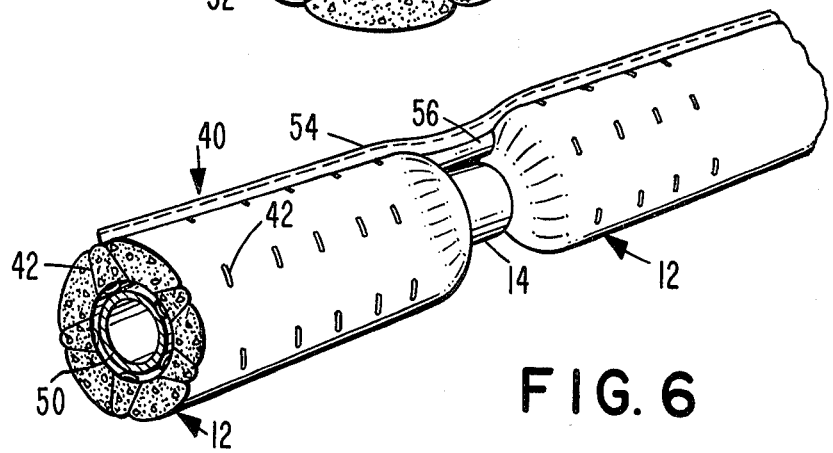

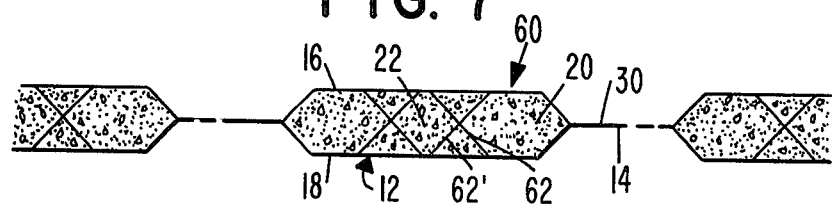
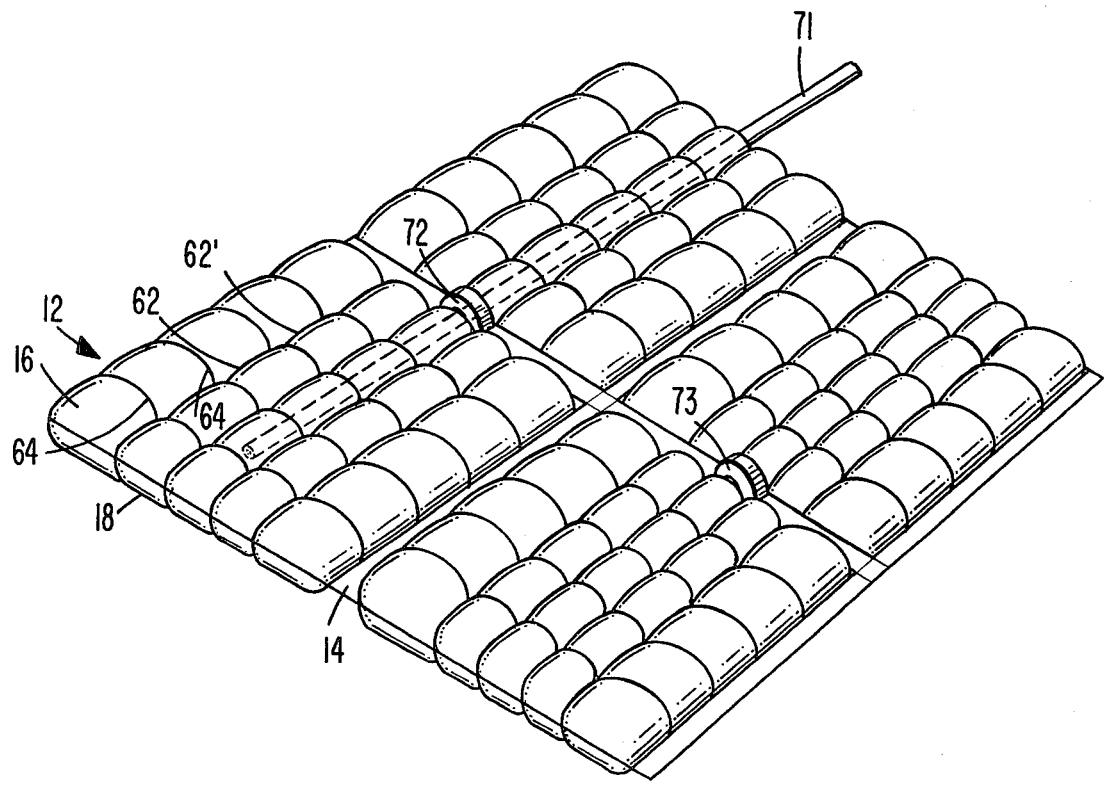

COATING AND PROTECTIVE DEVICE

FIELD OF THE INVENTION

The present invention is directed generally to a woven coating and protection device. More particularly, the present invention is directed to such a device which provides means for erosion control and which also is useable as protection and ballast for cylindrical or other types of elements such as underwater pipework. Most particularly, the coating and protection device of the present invention is a woven assembly having pockets or pouches for receiving a flowable, settable material such as cement and further which may include integral reinforcing guys to maintain a desired shape of the device.

The coating and protection device in accordance with the present invention is comprised of a woven mat having an array of pockets or pouches separated by flexible connections or joints which are formed by weaving together the two separate walls of the pocket thus forming a double thick connection between the pockets. In addition, various reinforcing guys of any desired number and orientation may be included in the mat and these serve to retain the desired shape of the device as it is filled with cement or the like and further retain the cement in place after it has hardened. The mats are intended for use either as an erosion control assembly or as a ballast and protective assembly for an undersea pipeline or the like.

DESCRIPTION OF THE PRIOR ART

It is well-known that one of the natural phenomena which results in great loss and which presently requires a great amount of attention is that of erosion caused by the movement of masses of water at the bottom of seas and rivers and along coasts and shores. For this reason several means have been devised for fixing earth or for covering it. However, these present solutions often are of relatively high cost and are somewhat complex in construction while not always giving the desired protective results.

Exemplary of such known means for controlling erosion and the like are the following patents.

U.S. Pat. No. 3,425,228 to Lamberton;
U.S. Pat. No. 3,474,626 to Colle;
U.S. Pat. No. 3,524,320 to Turzillo;
U.S. Pat. No. 3,561,219 to Nishizawa et al;
U.S. Pat. No. 3,696,623 to Heine et al;
U.S. Pat. No. 3,837,169 to Lamberton; and
U.S. Pat. No. 3,874,177 to De Winter.

All of these patents are directed to methods and means for preventing erosion, protecting beaches, and the like and as such are all generally similar to the present invention. In particular, the patents to Nishizawa et al, U.S. Pat. No. 3,561,219 and to Lamberton, U.S. Pat. No. 3,837,169 are directed to woven mat assemblies for use in erosion control wherein the mat is formed with pockets to receive a flowable slurry of material such as sand or cement. However, these prior art methods and means are not as satisfactory in structure and use as the mat in accordance with the present invention. In addition, the woven coating and protection device in accordance with the present invention has, as will be set forth hereinafter, features not shown or disclosed in the prior devices.

It is also well-known that the operation of offshore oil wells and the carrying of fluids to and from these wells usually requires pipework which has to be installed underwater and ballasted in most cases. These conduits are subject to the environment of marine currents and to damage due to corrosion. Therefore, they require means of coating and ballast which are conventionally of high cost, have a relatively short life, and which do not give the total protection sought thus resulting in the premature deterioration of the underwater installations.

Exemplary of known means for coating and ballasting underwater pipelines and the like are the following patents.

U.S. Pat. No. 2,373,439 to Wheatley;
U.S. Pat. No. 3,086,369 to Brown;
U.S. Pat. No. 3,240,512 to Pennington et al;
U.S. Pat. No. 3,793,845 to Keith;
U.S. Pat. No. 3,861,158 to Swain et al; and
U.S. Pat. No. 3,873,057 to Rochelle et al.

All but the most recent of these are directed to weights and the like which are either bolted to or attached about a portion or segment of the pipeline and as such provide little or no corrosion protection. The most recent patent to Rochelle et al, U.S. Pat. No. 3,873,057 is directed to an apparatus for use in molding a cementitious weight coating upon the extension surface of a pipe segment prior to its being laid upon the bed of a body of water. This affords protection and ballast for the pipe only so long as the cement is retained in place. If the pipe is bent during installation from a lay barge or the like, the coating of cement may fracture and separate from the pipe. In addition, since the pipe must be transported and handled in its coated state, it is heavy and cumbersome.

Thus, while it is known generally in the prior art to provide various mat and pouch assemblies for the retention of a flowable slurry for use in erosion control and further while it is known generally to weight and coat pipe lines for underwater installation, the prior art does not disclose the provision of a woven mat which is capable of being used either as an erosion prevention device or in ballasting and coating an underwater pipeline or similar object, and further does not disclose a unitary woven mat including reinforcing guys which are formed as a portion of the mat during its weaving.

SUMMARY OF THE INVENTION

The present invention is directed to a device which provides erosion protection for underwater slopes and beds and, in one of its embodiments provides the proper protection of cylindrical elements, thus providing means of coating and ballast so that a protective covering is provided for these slopes and bottoms, and for cylindrical elements for a reasonably long or predetermined time and at comparatively low cost by means of an installation and application method which can be carried out at the site of the work.

One of the main objectives of the invention is to provide a textile coating and protection device which supplies the combination of means of containment and reinforcement of settable materials, such as concrete, in order to provide a layer which prevents the direct access of the underwater environment, including masses of water in movement, to the slopes of the shores of seas, rivers, and canals and which may alternatively be used as a protection and ballast means for a pipeline or the like.

A further object of the invention is to provide a textile device for erosion control in which integral weaving is provided for the containing walls of a settable mass, for interior reinforcement guys, and for connection portions of the textile device to join the sections of the set mass. The textile device is capable of being produced continuously on any type of loom.

Another object of the invention is to provide a protective textile device which may be used in combination with a settable material, such as concrete, so that the filling of the device at its final installation site is made easier, and a weighted mass is provided upon the setting of the concrete which is fixed in place and capable of resisting water movements.

Still another object of the invention is to provide a textile device which, in addition to making possible its use in combination with settable materials, provides means of containment and reinforcement of the settable material so that the set mixture has additional resistance to destruction or disintegration.

Another object of the invention is to provide a textile device which, because of its structure, provides means of containment which will shape the settable mass, giving it a dimension and shape from a plurality of modular units to obtain erosion control and protection characteristics which are ideal for the specific problem to be solved.

Yet another object of the invention is to provide a textile device for erosion control and protection which may be installed as a unit in locations which present various settlement and surface characteristics, accommodating itself to the surface and allowing a certain movement of the individual parts of the unit without causing the destruction or disintegration of the unit.

A further object of the invention is to provide a device for erosion control and protection which, in its use in the coating of cylindrical pipework elements or of undersea cable, provides a total covering for protection against corrosion and in addition provides a means of ballast for the fixing of these cylindrical elements on the bottom of the underwater environment in which they are placed.

Still another object of the invention is to provide a textile device for the protection of cylindrical elements, which allows for differing thermal expansion and contraction of the pipework and coverings without affecting the device, thus establishing a longer life for the pipe or cable and cover.

Another object of the invention is to provide a textile device for erosion control which makes possible the obtaining of an assembly in which permeable parts and impermeable parts are combined and joined in a functional combination in such a way that they are allowed a certain adaptation to changes in the ground.

The device in accordance with the present invention overcomes difficulties encountered with the prior art devices and provides a mat which is capable of being filled with a settable material and positioned in situ, which has sufficient flexibility to conform to the surface of the bed, bank, or shore where it is placed, which may include either permeable or impermeable connecting webs between the filled pockets of settable material; and which may be provided with integral reinforcing guys. In addition, the present invention provides a device which is useable both as an erosion prevention device and as a means for providing ballast and a protective coating for a pipeline or similar cylindrical undersea object.

BRIEF DESCRIPTION OF THE DRAWINGS

While the novel features of the present invention are set forth with particularlity in the appended claims, a full and complete understanding of the present invention may be had by reference to the description of preferred embodiments as set forth hereinafter and as may be seen in the accompanying drawings in which:

FIG. 3 is a schematic cross section view of a second preferred embodiment of a coating and protection device in accordance with the present invention and showing integral reinforcments, or guys which go from wall to wall of the pouches for the settable mass;

FIG. 4 is a schematic cross section view of the device of FIG. 3 taken along line 4—4 in FIG. 3 and showing the arrangement of the integral guys;

FIG. 5 is a schematic cross section view of the protection and coating devices of FIGS. 3 and 4 being applied about an elongated pipe;

FIG. 6 is a perspective view of the assembly of FIG. 5 showing a pipe covering including a thermal expansion joint and fill tube conduit;

FIG. 7 is a schematic cross section view of a third preferred embodiment of a coating and protection device in accordance with the present invention showing the use of a plurality of reinforcements or guys arranged in a crossing pattern; and FIG. 8 is a perspective view of an erosion control device utilizing the mat of FIG. 7 and showing an array of filled pouches or pockets joined together by flexible portions whereby flexibility of the erosion control device is provided.

DESCRIPTION OF THE PREFERRED EMBODIMENTS

Generally, the present invention provides a textile device in which the weaving of the fibers is carried out in such a way that parts are supplied in which there are double, spaced apart layers which constitute containing walls for settable material and which are woven together to form single-layer portions which join together the pouches of material. The device is formed in a continuous process which may be carried out on any type of loom.

It is also characteristic of the invention that in one of its variations it provides, in the double-layer part, the joining of the separated part by guys or reinforcement and spacing strands which are provided during the weaving operation, and which extend from one wall to the other, forming an integral part of these walls.

It will be understood that the use of the term textile throughout the present application is not to be construed to limit the material used in the mat to any particular or specific fiber or the like. Rather, textile is to be read to mean any of a number of fabrics, either natural or synthetic which are capable of being woven on a conventional loom. It is further to be understood that any number of conventional looms could be utilized to produce the various mats in accordance with the present invention and that the invention is not directed to any specific weaving process but rather to the structure of the product so formed.

Figure 1:
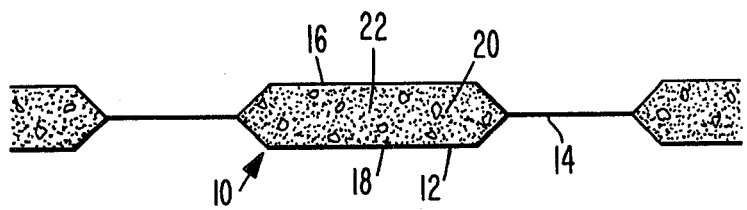
FIG. 1 is a schematic cross section view of a first embodiment of a coating and protection device in accordance with the present invention.

Turning now to FIG. 1, there may be seen generally at 10 a preferred embodiment of a coating and protection device in accordance with the present invention. As may be seen, device 10 is comprised generally of spaced containment portions 12 which are joined by flexible joints or connection portions 14. Each containment portion 12 is defined by spaced apart upper and lower wall sections 16 and 18, respectively which, when separated, form a pouch or pocket 20. This pocket may be filled with a slurry of settable material 22 which may be concrete or the like.

While FIG. 1 is a schematic illustration, it is to be understood that coating and protection device 10 is a woven fabric in which the upper and lower wall portions 16 and 18 are woven together at their ends to form the connection or joint portion 14. In this manner the device is given substantial strength and further eliminates the need for various fastening means as are utilized in prior art devices. As discussed above, the device 10 may be made from any of a number of either material and/or synthetic fibers and may be woven on a conventional basis. The shape and spacing of the containment portions 12 and the joints or connections 14 may also be varied to provide mats and protective wraps having varying degrees of flexibility thereby allowing necessary deformations to adapt to surfaces which are not flat. It should also be noted that the connection portions 14 may either be permeable or impermeable to water as desired and may thus either act as filtering means or as a barrier to the passage of water.

Figure 2:
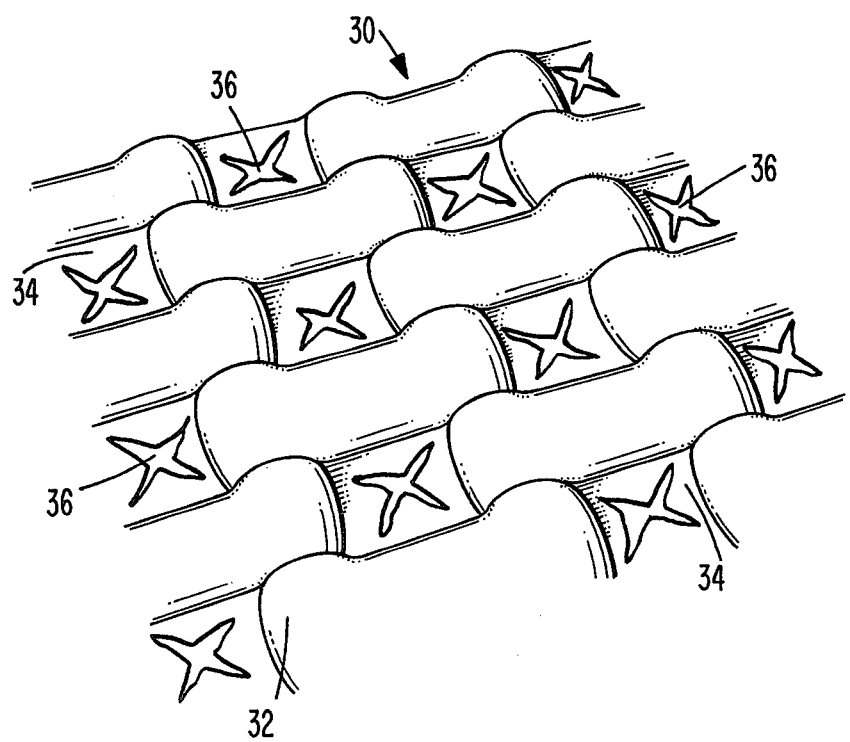
FIG. 2 is a perspective view of an erosion control mat made from the coating and protection device of FIG. 1 and showing the pouches of settable material and the flexible joining areas which may be open or closed.

There may be seen in FIG. 2 an erosion control mat generally at 30 which utilizes the woven fabric assembly 10 of FIG. 1. As may be seen, mat 30 is comprised of pouches or pockets 32 filled with a settable material with these pouches 32 being joined by flexible connections or joints 34. In this embodiment the joints 34 may be provided with openings 36 which may be cut in the joints or may be formed by other means. Openings 36 are advantageous where, for example, it is desired to place mat 30 on a bank and to allow vegetation to grow through the openings to hide or camouflage the mesh type mat. It will of course be recognized that joints 34, as has previously been discussed, may be either permeable or impermeable to act as filters or to prevent the flow of water. While mat 30 is shown in a generally "checkerboard" configuration of pouches 32 and joints 34, the specific spacing and arrangement may be varied as desired during manufacture to provide optimum erosion control as the particular installation site.

Turning now to FIGS. 3 and 4, there is shown a second embodiment of a coating and protection device generally at 40. This embodiment is generally similar to the first embodiment 10 as shown in FIG. 1 and the same numbers designate corresponding portions in devices 10 and 40. The coating and protective device 40 of FIGS. 3 and 4 further includes reinforcing guys or strands 42 which are formed as an integral portion of the walls 16 and 18 of the containment portions 12 during the weaving operation and which, as may be seen most clearly in FIG. 4, extend along each wall section for a certain length and which then cross through the pouch 20. As may be seen in FIG. 3 a number of these guys or reinforcing strands 42 are placed in each containment portion or pocket 12.

Guys 42 serve several purposes the first of which being to reinforce each containment portion 12 and to control its shape when the pouch or pocket 20 is filled with a settable slurry. Since the guys 42 extend along the upper and lower wall sections 16 and 18, they add reinforcement thereto. Also, since the length of guy 42 passing through the pouch 20 is fixed, the expansion of the pouch on introduction of the settable slurry is limited so that the mat, when filled, will retain a predetermined shape. The second function performed by the guys 42 is that of retention of the slurry in place once it has hardened. As the slurry is introduced into the pouches 20, it surrounds the reinforcing strands 42 and, upon hardening, becomes securely attached thereto. Should the mat be flexed or distorted during use so that the cement is cracked, the reinforcing strands 42 will act to maintain the cement in its intended position. This is the case even if the outer coverings 16 and 18 should start to disintegrate or become torn.

The use of coating and protection device 40 as a pipe coating and ballast means is shown in FIGS. 5 and 6. In this use of device 40, a pipe 50, which will be placed underwater and which may carry various fluids, is coated and ballasted by being wrapped with the coating and protection device 40. In FIG. 5 there is shown, a cross section view in which the device 40, as is shown in FIG. 4, is wrapped around pipe 50. The lower wall 18 of the pouch 20 contacts the outside surface of the pipe and the upper wall 16 is exposed. Since wall 18 is now of less length than wall 16, it is necessary to decrease the length of wall 18 by folding it and fastening these loops of excess material as may be seen schematically at 52. The ends of walls 16 and 18 are joined by sewing or other similar fastening means as may be seen schematically at 54 in FIG. 5.

A perspective view of the coated and ballasted pipe 50 of FIG. 5 may be seen in FIG. 6. As may be seen, the containment portions 12 are separated by the flexible joints 14 which, in this useage are given a tight weave to be impermeable and to provide corrosion protection for pipe 50. As may be seen in FIGS. 5 and 6, the reinforcing strands or guys 42 serve to maintain the proper shape of the coating device 40 as it is filled with a settable slurry. The pressure of the slurry is sufficient to cause it to completely fill the pouches of the containment portions even if the pipe is resting on the bottom where the slurry is pumped in.

In use, the pipeline is made up and is laid from a conventional lay barge. As the last step before the pipe is passed overboard, the protective and coating device 40 is wrapped about the pipe and is sewn in place. Each containment portion 12 includes a tubular passage (not shown) into which a flexible conduit may be passed and through which the settable slurry is pumped. To provide communcation between the containment portions 12, a section of flexible tube 56 is sewn across each of the flexible joints 14, as may be seen in FIG. 6. Flexible tube 56 passes between the tubular passageways in each containment portion 12 so that no settable slurry is lost. As the pipeline is lowered to the bottom of the body of water, a fixed length flexible conduit, which is inserted in the tubular passageway of the containment sections aboard the lay barge, conduits the settable slurry to the pipe coating 40 so that the containment portions 12 are filled in situ. As the lay barge moves along, the flexible conduit is withdrawn through the tubular passages and flexible tubes 56 so that no divers are required underwater. As was discussed above, the pressure of the slurry is adequate to completely fill each pouch uniformly about the pipe. The combination of the containment walls 16 and 18 and the reinforcing strands 42 not only forms a container for the settable slurry but also provides reinforcement therefor. The settable slurry provides corrosion protection for the pipeline and also provides ballast to prevent movement of the pipeline either by underwater currents or possible floating of the pipeline caused by the conveyance of fluids lighter than water.

The flexible portion 14 serves yet another function when device 40 is utilized as a pipe coating and ballast. Since the pipeline may well carry fluids at elevated temperatures while being submersed in relatively cold water and further since the thermal expansions of the pipe and the settable material may well not be the same, the joint 14 acts as an expansion joint of sorts and allows the pipe and coating to extend and contract the differing amounts. The joint 14 is able to either stretch or be compacted without being damaged and thus prevents damage to the pipe and coating due to differences in thermal expansion.

Turning now to FIGS. 7 and 8, there may be seen generally at 60 a third embodiment of a coating and protection device in accordance with the present invention. As may be seen in FIG. 7, device 60 is generally similar to first and second embodiments 10 and 40 and hence like numbers are used to designated corresponding portions.

As in the two prior described embodiments, the containment portions 12 of device 60 are formed of upper and lower walls 16 and 18 respectively, which are forced apart to form pouches 20 upon the introduction of a slurry of material. Walls 16 and 18 are each of a woven material and the two are woven together to form the flexible joints or connections 14 which are of any desired width and spacing, as may be desired.

The embodiment of FIGS. 7 and 8 differs from the two previously discussed embodiments in that the third embodiment, as may be seen in FIG. 7, includes a plurality of crossing reinforcement strands or guys 62, 62' which provide even greater reinforcement and mat shape definition than is provided by the guys 42 as shown in FIG. 3. Reinforcing strands 62, 62' of device 60 extend along the walls 16 and 18 of the containment portions 12 as do the guys 42 of device 40 but, as may be seen in FIG. 8, the guys 62, 62' alternate with each other in passing along the surface of the containment portions and also cross each other as they pass through the pouch 20, as may be seen in FIG. 7. The reinforcements 62, 62' of the device 60 perform the same functions as do guys 42 of device 40; i.e., that of reinforcing and controlling the shape of the mat and of retaining the slurry in place one it is set. The arrangement of reinforcing guys 62, 62', however, provides for greater reinforcement than does the arrangement of device 40.

The mat structure shown in FIG. 8 is exemplary of any number of arrangements of containment portions 12 and flexible joints 14 which may be provided. As was discussed above, the arrangement of these containment and joint portions is dictated by the type of surface to be covered, the amount of flexibility required, the severity of the water action anticipated and other similar factors. Should an even more durable mat be required, the device 60 of FIG. 7 can be further provided with exterior reinforcing strips 64 which, as may be seen in FIG. 8, extend across the surface of the containment portions generally perpendicularly to the direction of the reinforcing strands or guys 62, 62'. Strips 64 are formed integrally with the upper and lower walls 16 and 18 of the containment portions during the weaving process. Again, the flexible joint areas may be either permeable or impermeable as desired depending on the location contemplated for the erosion control device such as permeable if used above water and impermeable if used below.

As was the case in the prior embodiments, the settable slurry is introduced into the pouches of the containment portions by use of a suitable means such as a flexible tubing or injection pipe 71 which is withdrawn through the pouches and through interconnecting passages 72 and 73 in the flexible joints 14 as the pouches are filled. This filling is done in situ so that the device may be carried to its installation location in an unfilled state and then filled where it is to be placed, thereby substantially reducing transportation and handling costs.

Thus, it may be seen that the woven coating and protection device in accordance with the present invention provides a unitary woven structure having containment portions which provide pouches for the retention of a slurry which is preferably settable with these containment portions being joined to each other by integrally formed flexible joints or connections which are formed during a continuous weaving process and which consist of the wall sections of the containment portion being woven together at their ends. The woven coating and protection device in accordance with the present invention may be used on the land, below the water, or both as an erosion prevention mat and may be used to line canals, drainage and irrigation ditches and the like. In an alternate useage, the coating and protection device can be wrapped around a pipe prior to the pipe's being submerged and then be filled with a slurry to both ballast the pipe in place and also provide corrosion protection. The use of various integral guy strands, which are woven into the device during its production serve, as has been discussed above, to add reinforcement to the device, to control its shape during addition of the slurry, and to retain the hardened slurry in place should the hardened slurry become cracked and/or the mat damaged.

While preferred embodiments of a woven coating and protection device in accordance with the present invention have been hereinabove fully and completely described, it will be obvious to one of ordinary skill in the art that changes in, for example, the materials used to form the device, either natural or synthetic; the weaving process used; the positioning and arrangement of the containment and flexible connection portions; the number and location of the reinforcing guys or strands; and the means to place the settable slurry into the pockets may be varied without departing from the true spirit of the invention and that the invention is to be limited only by the scope of the following claims.

We claim:
1. A coating and protection device comprising:
 a plurality of spaced, generally rectangular containment portions, each said containment portion having spaced first and second walls forming pouches which receive a flowable, settable slurry, said walls being of woven construction;
 a plurality of flexible joints extending longitudinally and transversely between adjacent containment portions and joining said containment portions to form a flexible mat which is flexible both longitudinally and transversely after receipt and setting of a slurry, said flexible joints being formed by interweaving said first and second walls;

a plurality of interconnecting passages in said flexible joints extending between adjacent ones of said pouches, said interconnecting passages being structured to receive injection pipes insertable through a plurality of said pouches and said interconnecting passages to serially feed the slurry to said pouches as said injection pipes are withdrawn through said pouches and said interconnecting passages;

a plurality of reinforcing guys, each of said guys having a portion extending between said first and second walls and further having a portion woven integrally with said first and second walls; and reinforcing strands integrally formed with said walls and being disposed generally perpendicularly to said portions of said reinforcing guys woven integrally with said walls.

2. The coating and protection device of claim 1 wherein said flowable slurry is a cement which hardens within said pouches, said slurry hardening about said portions of said guys extending between said walls whereby said guys retain said hardened slurry in place.

3. The coating and protection device of claim 2 wherein said device is a fabric mat which, when filled with said slurry, forms an erosion control means.

4. The device of claim 3 wherein said joints are impermeable to liquid whereby said erosion control device will not allow the passage of liquid therethrough.

5. The device of claim 3 wherein said joints are permeable to liquid whereby said erosion control device will allow passage of liquid through said joints.

6. The coating and protection device of claim 2 wherein said device is secured about an elongated cylindrical object and which, when filled with said slurry forms a protective coating and ballast means for said elongated cylindrical object.

7. The coating and protection device of claim 1 further wherein said reinforcing strands intersect said reinforcing guys where said guys pass through said walls.

* * * * *